(12) United States Patent
Thomas et al.

(10) Patent No.: US 9,631,916 B2
(45) Date of Patent: Apr. 25, 2017

(54) COMPONENT INCLUDING STRUCTURES FOR DETERMINANT LOADING

(71) Applicant: Rolls-Royce Corporation, Indianapolis, IN (US)

(72) Inventors: David John Thomas, Brownsburg, IN (US); Richard Christopher Uskert, Noblesville, IN (US)

(73) Assignee: Rolls Royce Corporation, Indianapolis, IN (US)

( * ) Notice: Subject to any disclaimer, the term of this patent is extended or adjusted under 35 U.S.C. 154(b) by 571 days.

(21) Appl. No.: 14/141,953

(22) Filed: Dec. 27, 2013

(65) Prior Publication Data

US 2015/0354936 A1 Dec. 10, 2015

Related U.S. Application Data

(60) Provisional application No. 61/780,827, filed on Mar. 13, 2013.

(51) Int. Cl.
*B82Y 35/00* (2011.01)
*G01B 5/28* (2006.01)
(Continued)

(52) U.S. Cl.
CPC ................ *G01B 5/28* (2013.01); *B32B 18/00* (2013.01); *C04B 2235/945* (2013.01); *C04B 2235/963* (2013.01); *C04B 2237/341* (2013.01); *C04B 2237/343* (2013.01); *C04B 2237/363* (2013.01); *C04B 2237/365* (2013.01); *C04B 2237/38* (2013.01); *C04B 2237/704* (2013.01); *C04B 2237/76* (2013.01); *C04B 2237/84* (2013.01); *C04B 2237/86* (2013.01); *F01D 5/282* (2013.01); *F05D 2300/6033* (2013.01); *F05D 2300/702* (2013.01)

(58) Field of Classification Search
CPC ........................................................ G01B 5/28
USPC ........................................................... 73/105
See application file for complete search history.

(56) References Cited

U.S. PATENT DOCUMENTS

5,118,257 A * 6/1992 Blakeley ................ B64C 11/04
                                                                                                29/889.21
7,704,596 B2 * 4/2010 Merrill .................... B32B 3/266
                                                                                                416/241 B (Continued)

FOREIGN PATENT DOCUMENTS

EP         1803695 A1    7/2007

OTHER PUBLICATIONS

International Search Report and Written Opinion, mailed Mar. 17, 2014 for International Application No. PCT/US2013/078268, filed Dec. 30, 2013.

*Primary Examiner* — Lisa Caputo
*Assistant Examiner* — Octavia Hollington
(74) *Attorney, Agent, or Firm* — Brinks Gilson & Lione

(57) ABSTRACT

An apparatus including a first component having an exterior surface formed of a ceramic material and including a primary surface region and a plurality of secondary surface regions protruding from the primary surface region, and a second component positioned in contact with at least one of the secondary surface regions and spaced from the primary surface region to define a determinant load path between the first and second components. A method of forming the apparatus is also provided.

27 Claims, 3 Drawing Sheets

(51) Int. Cl.
*B32B 18/00* (2006.01)
*F01D 5/28* (2006.01)

(56) References Cited

U.S. PATENT DOCUMENTS

| | | | |
|---|---|---|---|
| 8,043,720 B2 * | 10/2011 | Corman | C04B 35/573 |
| | | | 428/408 |
| 9,080,454 B2 * | 7/2015 | Coupe | B29C 70/222 |
| 2007/0144561 A1 * | 6/2007 | Saijo | B28B 11/243 |
| | | | 134/40 |
| 2008/0236724 A1 | 10/2008 | Higuchi | |
| 2011/0229337 A1 * | 9/2011 | Carper | B32B 18/00 |
| | | | 416/241 B |
| 2011/0311368 A1 | 12/2011 | Coupe et al. | |
| 2012/0210718 A1 | 8/2012 | Lacy et al. | |
| 2012/0301275 A1 | 11/2012 | Suciu et al. | |

* cited by examiner

COMPONENT INCLUDING STRUCTURES FOR DETERMINANT LOADING

CROSS-REFERENCE TO RELATED APPLICATIONS

This application claims priority to U.S. Provisional Application Ser. No. 61/780,827, entitled "Component Including Structures for Determinant Loading," filed Mar. 13, 2013, which is hereby incorporated by reference in its entirety.

GOVERNMENT RIGHTS

The present application was made with United States government support under Contract No. DTFAWA-10-C-00006, awarded by the U.S. government. The United States government may have certain rights in the present application.

BACKGROUND

Many apparatuses or components thereof, such as but not limited to ceramic components, bear loads in use. When the apparatus comprises multiple components, the load may be transferred from one load-bearing component to another load-bearing component. This transfer of load can cause problems, including cracking or mechanical failure, when it is not properly controlled with respect to the portions of the components to or from which the load is transferred. Such control is not readily achieved in structures and apparatuses currently known in the art, leading to a variety of shortcomings and disadvantages. Thus, there is a need for further technical contribution to this field.

SUMMARY

A novel apparatus can comprise a first component having a ceramic exterior surface and including a primary surface region and a plurality of secondary surface regions protruding from the primary surface region, as well as a second component positioned to contact at least one of the secondary surface regions and spaced from the primary surface region to define at least one determinant load path between the first and second components. In some aspects, the apparatus can be further defined by one or more of particular types of ceramic matrices, particular surface roughness profiles, and particular spacings between the first and second components or regions thereof.

DETAILED DESCRIPTION OF THE ILLUSTRATED EMBODIMENTS

Figure 1:
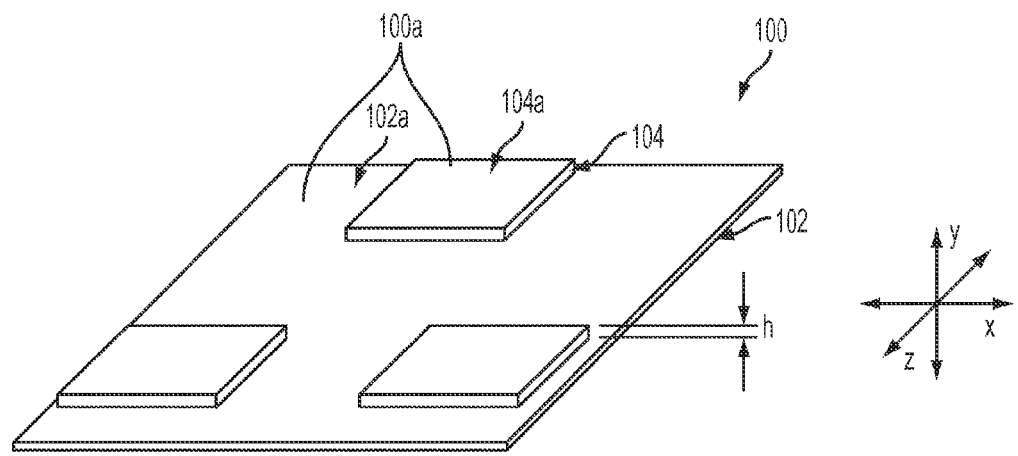
FIG. 1 is a perspective view of a component including structures for determinant loading according to one form of the invention, as shown somewhat schematically.

For the purposes of promoting an understanding of the principles of the invention, reference will now be made to the embodiments illustrated in the drawings and specific language will be used to describe the same. It will nevertheless be understood that no limitation of the scope of the invention is hereby intended. Any alterations and further modifications in the described embodiments, and any further applications of the principles of the invention as described herein are contemplated as would normally occur to one skilled in the art to which the invention relates.

Referring to FIG. 1, shown therein is a component 100 according to one form of the invention that generally includes a main body portion 102 and one or more load bearing portions 104, with the main body portion 102 defining a primary surface region 102a and each of the load bearing portions 104 defining a secondary surface region 104a. The primary surface region 102a and the secondary surface regions 104a together form an exterior surface 100a of the first component 100.

In one embodiment, the first component 100 includes a plurality of the load bearing portions 104, which in turn provide the exterior surface 100a with a plurality of the secondary surface regions 104a. As should be appreciated, the first component 100 may include two, three or four or more of the load bearing portions 104 which each define one of the secondary surface regions 104a. In another embodiment, the first component 100 may include a single loading portion 104, which in turn provides the exterior surface 100a with a single secondary surface region 104a. As will be discussed in greater detail below, the secondary surface regions 104a protrude from the primary surface region 102a (e.g., along the "y" axis). In one embodiment, each load bearing portion 104 is structured such that the secondary surface region 104a projects from the primary surface region 102a to a height h (also referred to herein as the "protrusion height") sufficient to define a determinant load path through one or more of the load bearing portions 104 when another component is brought into contact with the secondary surface regions 104a of the load bearing portions 104.

Figure 2:
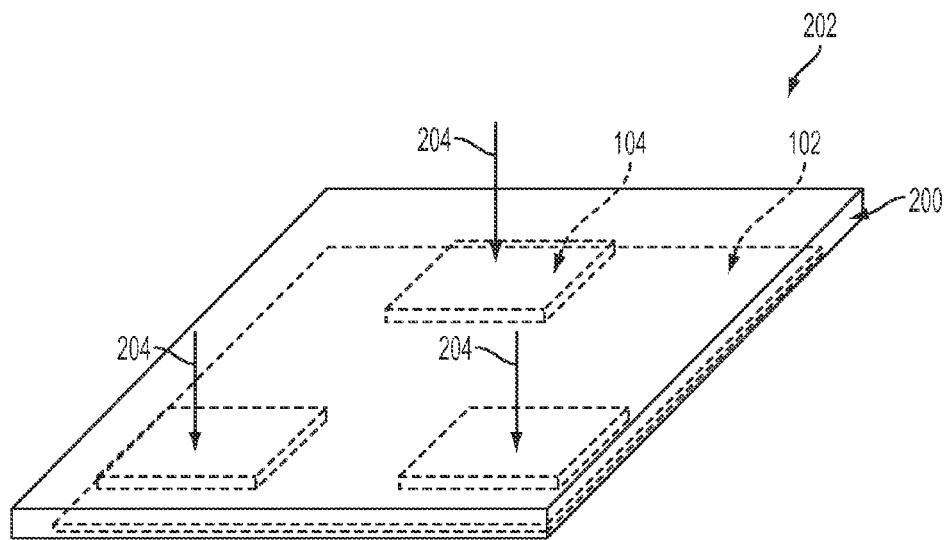
FIG. 2 is a perspective view of the component shown in FIG. 1 and a second component illustrating determinant loading therebetween.

Referring to FIG. 2, shown therein is a second component 200 engaged with the first component 100 to form a multi-component apparatus 202 according to one form of the invention. In the illustrated embodiment, the second component 200 is structured to contact the secondary surface regions 104a defined by the load bearing portions 104 of the first component 100, and is also structured to be spaced apart from the primary surface region 102a defined by the main body portion 102 of the first component 100. In one embodiment, the gap or space g (FIG. 3) defined between the second component 200 and the primary surface region 102a of the first component 100 may be used as an air gap in a turbomachinery component (e.g., a rotary turbine blade) to provide a pathway for cooling air flow. As should be appreciated, a load applied to the second component 200 may be selectively transmitted to the load bearing portions 104 of the first component 100 generally along predetermined load paths 204. As should also be appreciated, a load applied to the first component 100 may similarly be selectively transmitted to the second component 200 via the load bearing portions 104.

Referring back to FIG. 1, in one embodiment, the exterior surface 100a of the first component 100 can be formed of a ceramic material. In another embodiment, the first component 100 is provided as a ceramic matrix composite component. In this embodiment, the ceramic material forming the exterior surface 100a of the first component 100 comprises a ceramic matrix material. Examples of suitable ceramic matrix materials from which the exterior surface 100a may be formed include silicon carbide, alumina, silica, mullite, other known ceramic matrix materials, or a combination thereof. In other embodiments, the ceramic material forming the exterior surface 100a of the first component 100 may include one or more ceramic materials such as ceramic environmental protection coatings, ceramic thermal barrier coatings, other known ceramic materials, or a combination thereof. Additionally, the exterior surface 100a may be formed by one or more suitable processes or application techniques such as plasma spraying, physical vapor deposition, chemical vapor deposition, chemical vapor infiltration, directed vapor deposition, dipping, spraying, electroplating, other known formation or application processes, or a combination thereof.

The exterior surface 100a of the first component 100 generally has a surface roughness profile that can be characterized by one more parameters known and understood by those of ordinary skill in the art. Examples of such parameters include one or more height parameters (e.g., the average roughness Ra; the root mean squared roughness Rrms; maximum peak height Rt; skewness Rsk; the kurtosis Rku; or a combination thereof), one or more spacing parameters (e.g., mean peak spacing Smp), or a combination thereof. The surface roughness profile of the exterior surface 100a can be measured or otherwise analyzed by any suitable contact or non-contact technique using one or more suitable instruments (e.g., 2D profilometers, 3D profilometers, interferometric microscopes, confocal microscopes, structured light projectors, stereoscopic microscopes, line triangulation lasers, or a combination thereof).

In one embodiment, the protrusion height h of one or more of the load bearing portions 104 is selected to be greater than the maximum peak height Rt of the surface roughness profile in the primary surface region 102a of the exterior surface 100a. In another embodiment, a spacing distance d between adjacent load bearing portions 104 (as measured along the "x" axis and/or the "z" axis) may be greater than a mean peak spacing Smp of the surface roughness profile in the primary surface region 102a of the exterior surface 100a. In another embodiment, a length dimension/and/or width dimension w of the load bearing portion 104 (e.g., as measured long the "x" axis and/or the "z" axis) may be greater than a mean peak spacing Smp of the surface roughness profile in the primary surface region 102a of the exterior surface 100a. With the multi-component apparatus 202 constructed as exemplarily described above, the likelihood that the second component 200 will contact the load bearing portions 104 at the secondary surface regions 104a is substantially increased, while the likelihood that the second component 200 will contact the main body portion 102 at the primary surface region 102a is substantially eliminated or significantly reduced. Consequently, the load bearing portions 104 can be constructed to provide desired engagement of the secondary surface regions 104a of the first component 100 with the second component 200.

Figure 3:
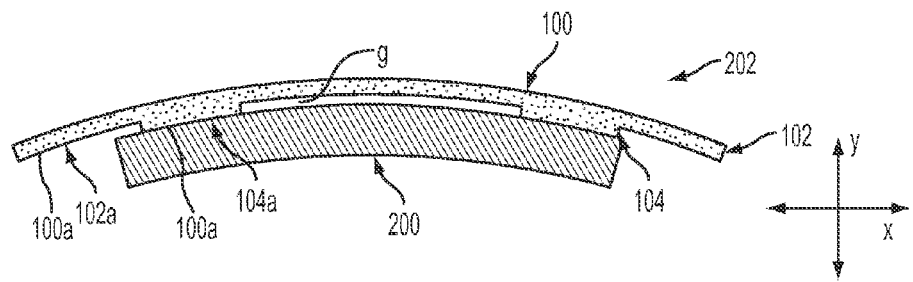
FIG. 3 is a sectional view of an apparatus including two components according to another form of the invention illustrating determinant loading therebetween.

In one embodiment, the overall shapes or primary forms of the primary and secondary surface regions 102a and 104a generally correspond to the primary form of the exterior surface 100a of the first component 100. For example, as illustrated in FIGS. 1 and 2, the primary form of the exterior surface 100a of the first component 100 is substantially planar generally along the "x" and "z" axes. Accordingly, the primary surface region 102a of the main body portion 102 and the secondary surface region 104a of each load bearing portion 104 are also substantially planar generally along the "x" and "z" axes. However, in other embodiments, the exterior surface 100a of the first component 100 may be curved about the "x," "y" and/or "z" axes. For example, referring to FIG. 3, the exterior surface 100a of the first component 100 may be curved about the "z" axis such that the exterior surface 100a has a concave form. As also shown in FIG. 3, the second component 200 may be positioned adjacent the exterior surface 100a and may have an exterior surface having a curved form (e.g., a convex form) corresponding to the curved form of the first component 100.

In some embodiments, the first component 100 can have a different (e.g., lower) coefficient of thermal expansion relative to the second component 200. For example, in embodiments where the first component 100 is formed of a ceramic material, the second component 200 can be formed of a metallic material. Because the load bearing portions 104 are structured as exemplarily described above, adequate engagement or mating of the exterior surface 100a of the first component 100 with an exterior surface of the second component 200 can be ensured over a wide range of temperatures, even when the components 100 and 200 have different coefficients of thermal expansion.

Having described the general structures associated with the first component 100 and the second component 200, exemplary constructions of the first component 100 according to various embodiments of the invention will now be discussed with reference to FIGS. 4 to 6.

Figure 4:
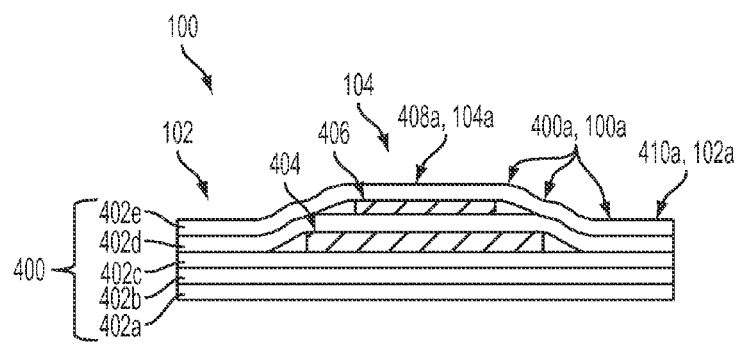
FIGS. 4 to 6 are partial sectional views illustrating exemplary embodiments of the component shown in FIG. 1.

Referring to FIG. 4, in one embodiment, the first component 100 may include a preform structure 400 formed of a reinforcing material and a ceramic matrix material (not shown) surrounding, either completely or only partially, the preform structure 400. The ceramic matrix material may be provided by one or more suitable processes or application techniques such as, for example, plasma spraying, physical vapor deposition, chemical vapor deposition, chemical vapor infiltration, directed vapor deposition, dipping, spraying, electroplating, or a combination thereof. In one embodiment, the ceramic matrix material may form the exterior surface 100a of the first component 100, as described in detail above with reference to FIG. 1.

In the illustrated embodiment, the preform structure 400 includes a plurality of plies (e.g., plies 402a, 402b, 402c, 402d and 402e) of a reinforcement material arranged in a stacked configuration. Examples of suitable reinforcement materials include carbon, silicon carbide, alumina, silica, and mullite, or a combination thereof. In one embodiment, the preform structure 400 further includes one or more inserts such as, for example, inserts 404 and 406. In one embodiment, the inserts 404 and 406 are provided as plies of reinforcement material, which may be the same as or different from the reinforcement material of the plies 402a-402e. As exemplarily illustrated in FIG. 4, the insert 404 is interposed between a pair of the adjacent plies 402c and 402d of the reinforcement material, and the insert 406 is interposed between a pair of the adjacent plies 402d and 402e of the reinforcement material. However, it should be appreciated that one or more inserts may be provided anywhere within or on the preform structure 400. For example, two or more inserts may be interposed between an adjacent pair of the plies (e.g., plies 402d and 402e. In another example, at least one insert may be disposed on an uppermost or outermost ply of the stack of plies (e.g., ply 402e).

As exemplarily shown in FIG. 4, the preform structure 400 defines an upper/exterior surface 400a. When incorporated within the preform structure 400, the inserts 404 and 406 cause a portion of the exterior surface 400a (e.g., surface portion 408a) to protrude from another portion of the exterior surface 400a (e.g., surface portion 410a). After the ceramic matrix material is provided to surround the preform structure 400, the location of the surface portion 410a defined by the exterior surface 400a corresponds to the location of the primary surface region 102a defined by the first component 100. Likewise, the location of the surface portion 408a defined by the exterior surface 400a corresponds to the location of the secondary surface region 104a defined by the first component 100. Thus, the load bearing portions 104 of the first component 100 is defined by the portions of the preform structure 400 adjacent to the inserts 404, 406.

Figure 5:
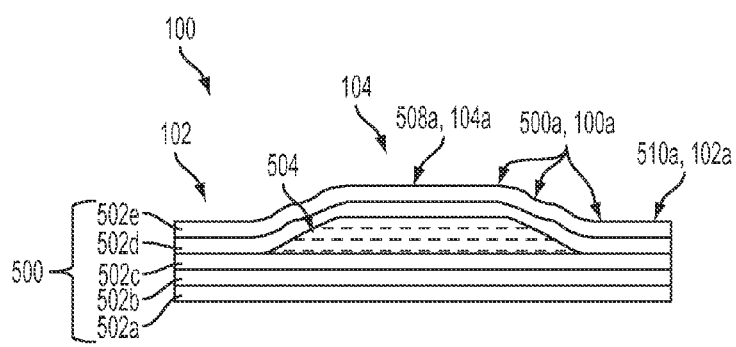

Referring to FIG. 5, in one embodiment, the first component 100 may include a preform structure 500 formed of a reinforcing material and a ceramic matrix material (not shown) surrounding, either completely or only partially, the preform structure 500. In the illustrated embodiment, the preform structure 500 includes a plurality of plies (e.g., plies 502a, 502b, 502c, 502d and 502e) of a reinforcement material arranged in a stacked configuration. Examples of suitable reinforcement materials include carbon, silicon carbide, alumina, silica, and mullite, or a combination thereof. In many respects, the preform structure 500 is configured similar to the preform structure 400 illustrated and described above with regard to FIG. 4. However, unlike the preform structure 400 including the inserts 404 and 406, the preform structure 500 includes an insert 504 configured as a pad formed of, for example, chopped fiber. As exemplarily illustrated in FIG. 5, the pad 504 is interposed between a pair of the adjacent plies 502c and 502d of the reinforcement material. However, it should be appreciated that one or more pads or inserts may be provided anywhere within or on the preform structure 500. For example, another pad 504 and/or one or more of the inserts 404, 406 may be interposed between another pair of the adjacent plies and/or disposed on an uppermost or outermost ply of the stack of plies (e.g., ply 502e).

Additionally, similar to the preform structure 400, the preform structure 500 defines an upper/exterior surface 500a. When incorporated within the preform structure 500, the pad 504 causes a portion of the exterior surface 500a (e.g., surface portion 508a) to protrude from another portion of the exterior surface 500a (e.g., surface portion 510a). After the ceramic matrix material is provided to surround the preform structure 500, the location of the surface portion 510a defined by the exterior surface 500a corresponds to the location of the primary surface region 102a defined by the first component 100. Likewise, the location of the surface portion 508a defined by the exterior surface 500a corresponds to the location of the secondary surface region 104a defined by the first component 100. Thus, the load bearing portions 104 of the first component 100 include the portions of the preform structure 500 adjacent to the pad 504.

Figure 6:
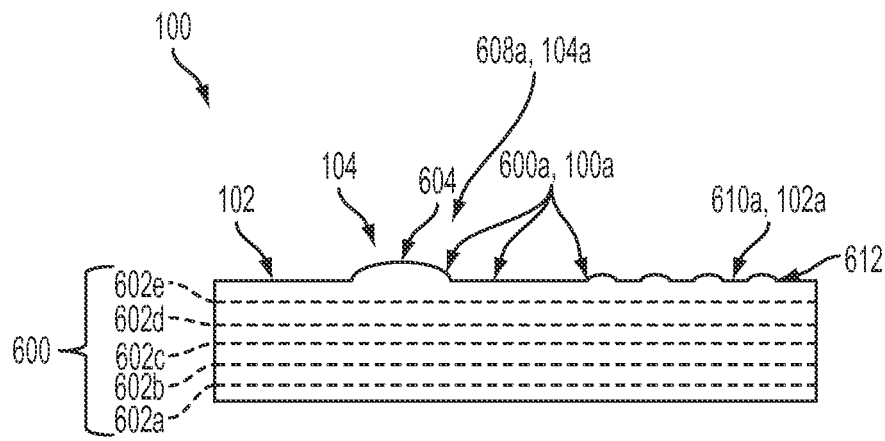

Referring to FIG. 6, in one embodiment, the first component 100 may include a preform structure 600 formed of a reinforcing material and a ceramic matrix material (not shown) surrounding, either completely or only partially, the preform structure 600. In the illustrated embodiment, the preform structure 600 includes a plurality of plies (e.g., plies 602a, 602b, 602c, 602d and 602e) of a reinforcement material arranged in a stacked configuration. Examples of suitable reinforcement materials include carbon, silicon carbide, alumina, silica, and mullite, or a combination thereof. In many respects, the preform structure 600 is configured similar to the preform structures 400 and 500 illustrated and described above with regard to FIGS. 4 and 5. However, unlike the preform structures 400 and 500 including inserts or pads interposed between adjacent plies of the reinforcement material, the preform structure 600 includes one or more bumps 604 formed along the upper/exterior surface 600a.

In the illustrated embodiment of the preform structure 600, a ceramic matrix material surrounds the preform structure 600. In one embodiment, the ceramic matrix material is applied by any process or technique (e.g., a chemical vapor infiltration process) suitable to form one or more bumps or protrusions, such as the bump 604, along the upper/exterior surface 600a. The bumps 604 define a protruding portion of the exterior surface 600a (e.g., surface portion 608a) that protrudes from another portion of the exterior surface 600a (e.g., surface portion 610a). After the ceramic matrix material 602 is applied to the preform structure 500, the location of the surface portion 610a defined by the exterior surface 600a corresponds to the location of the primary surface region 102a defined by the first component 100, and the location of the surface portion 608a or bump 604 defined by the exterior surface 600a corresponds to the location of the secondary surface region 104a defined by the first component 100. Thus, the region of the ceramic matrix material forming the one or more bumps 604 corresponds to the load bearing portions 104 of the first component 100. In one embodiment, the process used to provide the ceramic matrix material (e.g., a chemical vapor infiltration process) may form relatively small surface asperities 612 that are sized smaller than the bump 604. The cause of these relatively smaller surface asperities 612 can arise from the use of tooling employed during the chemical vapor infiltration process. These surface asperities 612 may form part of the primary surface region 102a of the first component 100.

Figure 7:
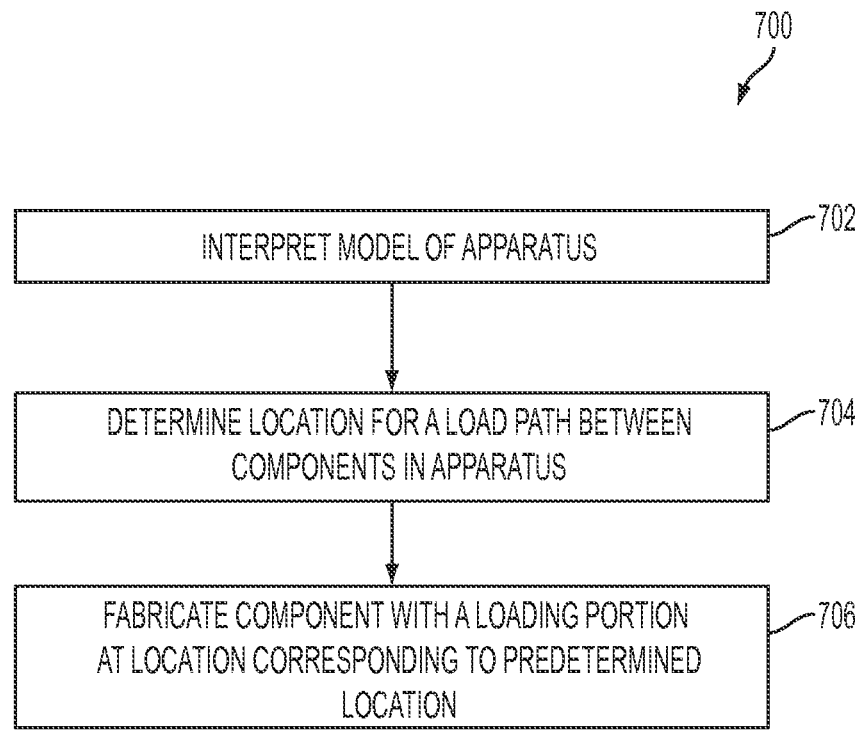
FIG. 7 is a flow chart illustrating an exemplary embodiment of a process of forming the component shown in FIG. 1.

As exemplarily described above, a component 100 can be provided with one or more load bearing portions 104 structured to define a predetermined load path at one or more locations along the first component 100 when another component (e.g., the second component 200) is brought into contact with the exterior surface 100a of the first component 100. With reference to FIG. 7, illustrated therein is an exemplary process or technique 700 for determining where to locate one or more of the load bearing portions 104 along the first component 100. The exemplary process or technique 700 may include, for example, the step 702 of interpreting a model of an apparatus, the step 704 of determining a location for a load path between components in the apparatus, and the step 706 of fabricating the component 100 with at least one load bearing portion at a location corresponding to the load path. However, it should be understood that other suitable processes or techniques for determining where to locate one or more load bearing portions 104 along the first component 100 are also contemplated.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a first ceramic matrix composite component comprising a plurality of stacked plies and having an exterior surface including a primary surface region and a plurality of secondary surface regions, each of the plurality of secondary surface regions being spaced apart from each other by a portion of the primary surface region and protruding from a first side of the primary surface region wherein the primary surface region and the plurality of second surface regions are formed by an outermost ply of the plurality of stacked plies; and
a second component positioned in contact with at least one of the secondary surface regions and spaced from the primary surface region to thereby define at least one determinant load path between the first ceramic matrix composite component and the second component.

2. The apparatus of claim 1 wherein the exterior surface of the first ceramic matrix composite component has a surface roughness profile, and wherein a width of each of the secondary surface regions is greater than a mean peak spacing of the surface roughness profile.

3. The apparatus of claim 1 wherein the exterior surface of the first ceramic matrix composite component has a surface roughness profile; and
wherein a distance between adjacent ones of the secondary surface regions is greater than the mean peak spacing of the surface roughness profile.

4. The apparatus of claim 1, wherein the first ceramic matrix composite component further comprises
a ceramic matrix material surrounding the plurality of stacked plies.

5. The apparatus of claim 4, wherein the plurality of secondary surface regions comprise tool bumps formed along the exterior surface of the first ceramic matrix composite component.

6. The apparatus of claim 4, further comprising at least one insert interposed between an adjacent pair of the plurality of stacked plies at a location corresponding to at least one of the secondary surface regions.

7. The apparatus of claim 6, wherein a shape of the at least one insert corresponds to a shape of the at least one of the plurality of secondary surface regions.

8. The apparatus of claim 6, wherein the first ceramic matrix composite component comprises a plurality of the inserts.

9. The apparatus of claim 8, wherein at least two of the plurality of inserts are separated from each other by at least one of the plurality of stacked plies.

10. The apparatus of claim 8, wherein the plurality of inserts comprises:
a first of the inserts interposed between a first adjacent pair of the plurality of stacked plies at a location corresponding to the at least one of the plurality of secondary surface regions; and
a second of the inserts interposed between a second adjacent pair of the stacked plies at a location corresponding to the at least one of the plurality of secondary surface regions.

11. The apparatus of claim 6, wherein the at least one insert includes a reinforcement material that is the same as a reinforcement material of at least one of the plurality of stacked plies.

12. The apparatus of claim 6, wherein the at least one insert includes a reinforcement material that is different from a reinforcement material of at least one of the plurality of stacked plies.

13. The apparatus of claim 6, wherein the at least one insert includes a ply of reinforcement material.

14. The apparatus of claim 6, wherein the at least one insert includes chopped fibers.

15. The apparatus of claim 1, wherein the second component is metallic.

16. The apparatus of claim 1, wherein a coefficient of thermal expansion of the first ceramic matrix composite component is different from a coefficient of thermal expansion of the second component.

17. The apparatus of claim 1, wherein at least a portion of the exterior surface of the first ceramic matrix composite component has at least one form selected from the group consisting of: a planar form and a curved form.

18. The apparatus of claim 17, wherein at least the portion of the exterior surface of the first ceramic matrix composite component is concave; and
wherein an exterior surface of the second component facing the concave portion of the first ceramic matrix composite component is convex.

19. An apparatus comprising:
a first ceramic matrix composite component comprising a plurality of stacked plies and having an exterior surface, the first ceramic matrix component component including:
a main body portion forming a primary surface region of the exterior surface; and
a plurality of load bearing portions protruding from a first side of the primary surface region and forming a plurality of secondary surface regions, wherein each of the plurality of secondary surface regions are spaced apart from each other by a portion of the primary surface region and wherein the primary surface region and the plurality of second surface regions are defined by an outermost ply of the plurality of stacked plies; and
a second component positioned in contact with at least one of the plurality of secondary surface regions and being spaced from the primary surface region to thereby define at least one determinant load path between the first ceramic matrix composite component and the second component.

20. The apparatus of claim 19, wherein the first ceramic matrix composite component comprises
a ceramic matrix material surrounding the plurality of plies.

21. The apparatus of claim 20,
wherein the first ceramic matrix composite component further comprises at least one insert interposed between an adjacent pair of the plurality of stacked plies at a location corresponding to at least one of the plurality of secondary surface regions.

22. The apparatus of claim 21, wherein the at least one insert comprises a plurality of inserts including:
a first of the inserts interposed between a first adjacent pair of the plurality of stacked plies at a location corresponding to the at least one of the plurality of secondary surface regions; and a second of the inserts interposed between a second adjacent pair of the plurality of stacked plies at a location corresponding to the at least one of the plurality of secondary surface regions.

23. A method comprising:

interpreting a model of an apparatus including a model of a first ceramic matrix composite component and a model of a second component structured to contact the first ceramic matrix composite component;

based on the interpreting, determining a location for a determinant load path between the model of the first ceramic matrix composite component and the model of the second component; and fabricating a first ceramic matrix composite component corresponding to the model of the first ceramic matrix composite component and fabricating a second component corresponding to the model of the second component, the fabricated first ceramic matrix composite component comprising a plurality of stacked plies and including:

an exterior surface a main body portion forming a primary surface region of the exterior surface; and a load bearing portion forming a plurality of secondary surface regions spaced apart from each other by a portion of the primary surface region, the secondary surface regions protruding from a first side of the primary surface region wherein the primary surface region and the secondary surface region are defined by an outermost ply of the plurality of stacked plies; and engaging the fabricated second component with the secondary surface region of the fabricated first ceramic matrix composite component to thereby define a determinant load path between the fabricated first ceramic matrix composite component and the fabricated second component.

24. The method of claim 23, wherein the fabricating of the first ceramic matrix composite component includes:

forming a preform structure comprising a reinforcement material; and infiltrating the preform structure with matrix material.

25. The method of claim 24, wherein infiltrating the preform structure with the matrix material comprises forming a bump of the matrix material at a location corresponding to the load bearing portion.

26. The method of claim 24, wherein the preform structure comprises a plurality of stacked plies of the reinforcement material; and wherein the fabricating further comprises positioning an insert between at least two of the plurality of stacked plies at a location corresponding to the load bearing portion.

27. The method of claim 23, wherein the fabricating of the first ceramic matrix composite component includes:

forming a preform structure comprising a plurality of stacked plies of reinforcement material; and positioning an insert between at least two of the plurality of stacked plies at a location corresponding to the load bearing portion.

\* \* \* \* \*